(12) United States Patent
Mishra et al.

(10) Patent No.: US 12,504,171 B2
(45) Date of Patent: Dec. 23, 2025

(54) PREMIXER FOR A COMBUSTOR

(71) Applicant: General Electric Company, Evendale, OH (US)

(72) Inventors: Ranjeet Kumar Mishra, Bengaluru (IN); Jayanth Sekar, Bengaluru (IN); Pradeep Naik, Bengaluru (IN); Gregory A. Boardman, Owens Cross Roads, AL (US); Randall C. Boehm, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/967,923

(22) Filed: Dec. 4, 2024

(65) Prior Publication Data

US 2025/0123001 A1    Apr. 17, 2025

Related U.S. Application Data

(62) Division of application No. 18/342,960, filed on Jun. 28, 2023, now Pat. No. 12,163,664, which is a division of application No. 16/737,040, filed on Jan. 8, 2020, now Pat. No. 11,713,881.

(51) Int. Cl.
  *F23R 3/28* (2006.01)
  *F23R 3/14* (2006.01)
  *F23C 7/00* (2006.01)

(52) U.S. Cl.
  CPC ............... *F23R 3/286* (2013.01); *F23R 3/14* (2013.01); *F23C 7/004* (2013.01)

(58) Field of Classification Search
  CPC ............. F23R 3/286; F23R 3/14; F23C 7/004
  See application file for complete search history.

(56) References Cited

U.S. PATENT DOCUMENTS

| | | | |
|---|---|---|---|
| 2,591,549 A | 4/1952 | Jonker | |
| 5,351,477 A | 10/1994 | Joshi et al. | |
| 5,603,211 A | 2/1997 | Graves | |
| 5,680,766 A | 10/1997 | Joshi et al. | |

(Continued)

FOREIGN PATENT DOCUMENTS

| | | |
|---|---|---|
| GB | 2112067 A | 7/1983 |
| GB | 2176535 A | 12/1986 |

*Primary Examiner* — Lorne E Meade
*Assistant Examiner* — Alyson Joan Harrington
(74) *Attorney, Agent, or Firm* — Venable LLP; Michele V. Frank (57) ABSTRACT

A premixer for a combustor includes: a centerbody having a hollow interior cavity; a swirler assembly radially outward of the centerbody; a peripheral wall disposed radially outward of the centerbody and the swirler assembly such that a mixing duct is defined between the peripheral wall and the centerbody, downstream from the swirler assembly; an annular splitter radially inward of the swirler assembly and radially outward of the centerbody such that a radial gap is defined between the splitter and an outer surface of the centerbody, wherein the splitter includes a trailing edge which extends axially aft of the swirler assembly; a fuel gallery disposed inside the interior cavity of the centerbody; and at least one fuel injector extending outward from the fuel gallery and passing through an injector port communicating with the outer surface of the splitter.

19 Claims, 7 Drawing Sheets

(56) References Cited

U.S. PATENT DOCUMENTS

| | | | |
|---|---|---|---|
| 6,123,273 | A | 9/2000 | Loprinzo et al. |
| 6,141,967 | A | 11/2000 | Angel et al. |
| 6,415,594 | B1 * | 7/2002 | Durbin .................... F23R 3/286 60/748 |
| 6,993,916 | B2 | 2/2006 | Johnson et al. |
| 7,266,945 | B2 | 9/2007 | Sanders |
| 7,896,620 | B1 | 3/2011 | Ewing, Jr. |
| 2012/0073302 | A1 | 3/2012 | Myers et al. |
| 2018/0030834 | A1 | 2/2018 | Choi |
| 2018/0112595 | A1 | 4/2018 | Johns et al. |
| 2018/0156464 | A1 | 6/2018 | Dai et al. |
| 2018/0187550 | A1 | 7/2018 | Döbbeling et al. |
| 2018/0298824 | A1 | 10/2018 | Matsuyama et al. |

* cited by examiner

PREMIXER FOR A COMBUSTOR

CROSS-REFERENCE TO RELATED APPLICATIONS

This application is a divisional of U.S. patent application Ser. No. 18/342,960 filed on Jun. 28, 2023, which is a divisional of U.S. patent application Ser. No. 16/737,040 filed on Jan. 8, 2020, which issued as U.S. Pat. No. 11,713,881 on Aug. 1, 2023, the entire contents of each of which are hereby incorporated by reference in their entireties.

BACKGROUND OF THE INVENTION

The present invention relates generally to combustors, and more particularly to gas turbine engine combustor premixers.

A gas turbine engine typically includes, in serial flow communication, a low-pressure compressor or booster, a high-pressure compressor, a combustor, a high-pressure turbine, and a low-pressure turbine. The combustor generates combustion gases that are channeled in succession to the high-pressure turbine where they are expanded to drive the high-pressure turbine, and then to the low-pressure turbine where they are further expanded to drive the low-pressure turbine. The high-pressure turbine is drivingly connected to the high-pressure compressor via a first rotor shaft, and the low-pressure turbine is drivingly connected to the booster via a second rotor shaft.

One type of combustor known in the prior art includes an annular array of domes interconnecting the upstream ends of annular inner and outer liners. These may be arranged, for example, as "single annular combustors" having one ring of domes, "double annular combustors" having two rings of domes, or "triple annular" combustors having three rings of domes.

Typically, each dome is provided with an array of premixer cups (or simply "premixers").

One problem with such premixers is they can exhibit a recirculation bubble on the centerbody or other wall surfaces, which is a flameholding and coking risk.

BRIEF DESCRIPTION OF THE INVENTION

This problem is addressed by a combustor premixer including one or more features to provide air-fuel mixing and keep liquid fuel away from wall surfaces of the premixer.

According to one aspect of the technology described herein, a premixer for a combustor includes: a centerbody disposed along an axis of symmetry, the centerbody including a hollow interior cavity; a swirler assembly disposed radially outward of the centerbody, the swirler assembly including at least one swirler configured to impart a tangential velocity component to an air flow passing therethrough; an annular peripheral wall disposed radially outward of the centerbody and the swirler assembly such that a mixing duct is defined between the peripheral wall and the centerbody, downstream from the swirler assembly; an annular splitter positioned radially inward of the swirler assembly and radially outward of the centerbody such that a radial gap is defined between the splitter and an outer surface of the centerbody, wherein the splitter includes a trailing edge which extends axially aft of the swirler assembly; a fuel gallery disposed inside the interior cavity of the centerbody; and at least one fuel injector extending outward from the fuel gallery and passing through an injector port communicating with the outer surface of the splitter.

According to another aspect of the technology described herein, a premixer for a combustor includes: a centerbody disposed along an axis of symmetry, the centerbody including a hollow interior cavity; a swirler assembly disposed radially outward of the centerbody, the swirler assembly including at least one swirler configured to impart a tangential velocity component to an air flow passing therethrough; an annular peripheral wall disposed radially outward of the centerbody and the swirler assembly such that a mixing duct is defined between the peripheral wall and the centerbody, downstream from the swirler assembly; a fuel gallery disposed inside the interior cavity of the centerbody; at least one fuel injector extending outward from the fuel gallery and passing through an injector port in the centerbody; and a discharge slot having a convex-forward shape passing through the centerbody downstream of the injector port and communicating with the interior cavity.

According to another aspect of the technology described herein, a premixer for a combustor includes: a centerbody disposed along an axis of symmetry, the centerbody including a hollow interior cavity; a swirler assembly disposed radially outward of the centerbody, the swirler assembly including inner and outer swirlers configured to impart a tangential velocity component to an air flow passing therethrough, separated by an annular hub; an annular peripheral wall disposed radially outward of the centerbody and the swirler assembly such that a mixing duct is defined between the peripheral wall and the centerbody, downstream from the swirler assembly; a fuel gallery disposed inside the interior cavity of the centerbody; at least one fuel injector extending outward from the fuel gallery and passing through an injector port in the centerbody; and wherein the hub includes an aft portion defining a splitter lip which extends aft beyond both the inner and outer swirlers.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
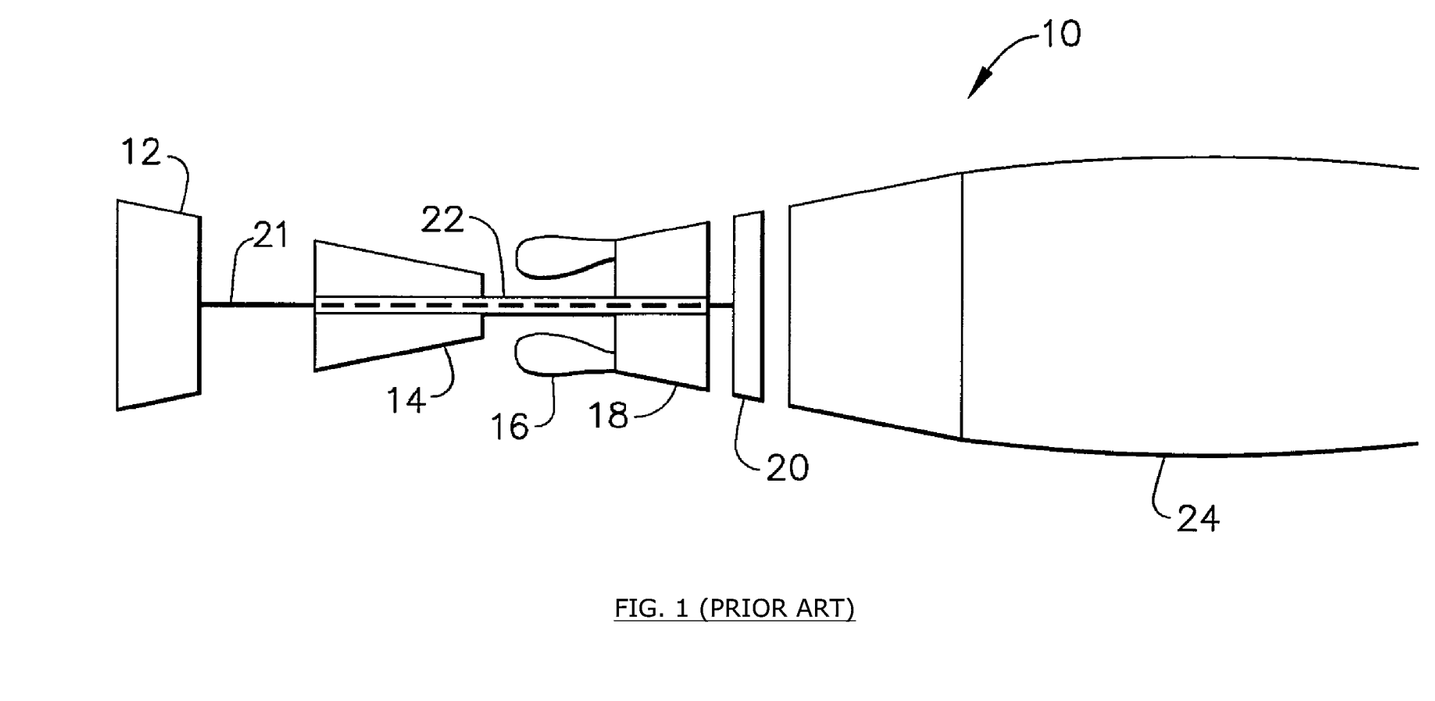
FIG. 1 is a schematic illustration of a prior art gas turbine engine.

Referring to the drawings wherein identical reference numerals denote the same elements throughout the various views, FIG. 1 is a schematic illustration of a gas turbine engine 10 including a low-pressure compressor 12, a high-pressure compressor 14, and a combustor 16. Engine 10 also includes a high-pressure turbine 18 and a low-pressure turbine 20. Compressor 12 and turbine 20 are coupled by a first shaft 21, and compressor 14 and turbine 18 are coupled by a second shaft 22. First and second shafts 21, 22 are disposed coaxially about a centerline axis 11 of the engine 10.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
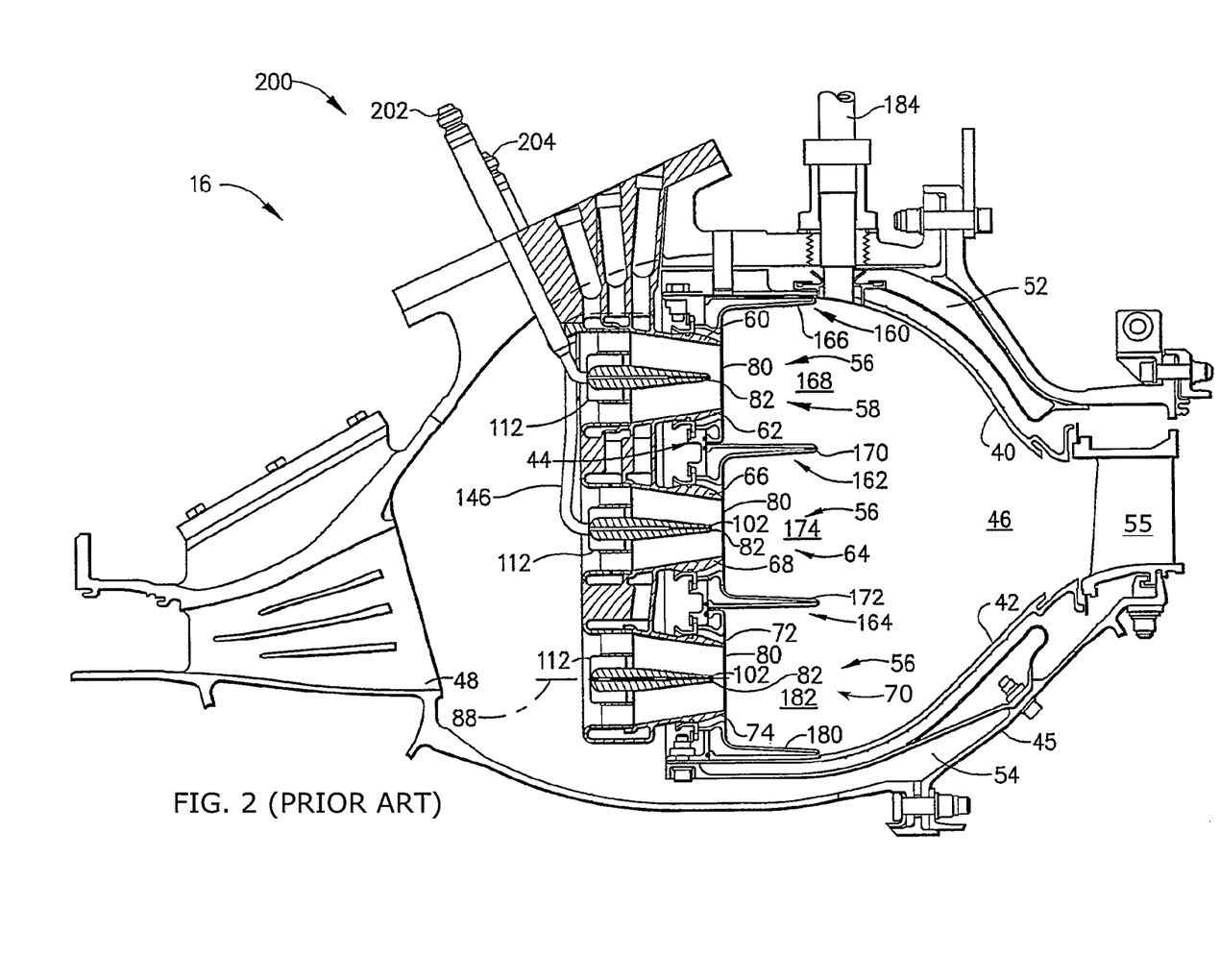
FIG. 2 is a schematic, half-sectional view of a prior art combustor used with the gas turbine engine shown in FIG. 1.
Figure 3:
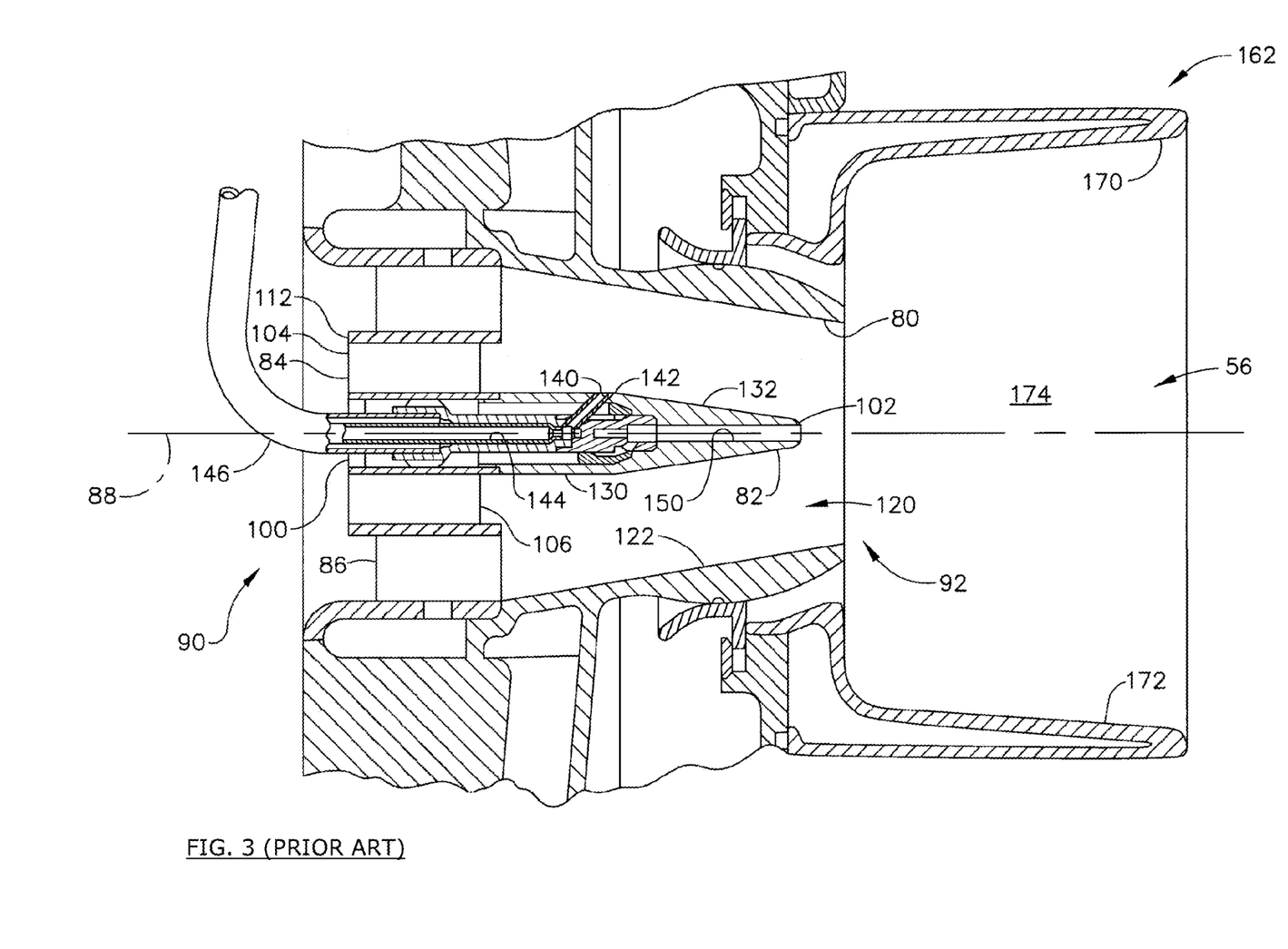
FIG. 3 is an enlarged view of a portion of a premixer shown in FIG. 2.

FIGS. 2 and 3 are a cross-sectional view and an enlarged partial cross-sectional view, respectively, of combustor 16 used in gas turbine engine 10 (shown in FIG. 1). Because a fuel/air mixture supplied to combustor 16 contains more air than is required to fully combust the fuel, and because the air is mixed with the fuel prior to combustion, combustor 16 may be describe as a lean premix combustor. Accordingly, a fuel/air mixture equivalence ratio for combustor 16 may be less than one. Furthermore, because combustor 16 does not include water injection, combustor 16 is a dry low emissions combustor. Combustor 16 includes an annular outer liner 40, an annular inner liner 42, and a domed end 44 extending between outer and inner liners 40 and 42, respectively. Outer liner 40 and inner liner 42 are spaced radially inward from a combustor casing 45 and define a combustion chamber 46. Combustor casing 45 is generally annular and extends downstream from a diffuser 48. Combustion chamber 46 is generally annular in shape and is disposed radially inward from liners 40 and 42. Outer liner 40 and combustor casing 45 define an outer passageway 52 and inner liner 42 and combustor casing 45 define an inner passageway 54. Outer and inner liners 40 and 42 extend to a turbine nozzle 55 disposed downstream from diffuser 48.

Combustor domed end 44 includes a plurality of domes 56 arranged in a triple annular configuration. Alternatively, combustor domed end 44 includes a double annular configuration. In another embodiment, combustor domed end 44 includes a single annular configuration. An outer dome 58 includes an outer end 60 fixedly attached to combustor outer liner 40 and an inner end 62 fixedly attached to a middle dome 64. Middle dome 64 includes an outer end 66 attached to outer dome inner end 62 and an inner end 68 attached to an inner dome 70. Accordingly, middle dome 64 is between outer and inner domes 58 and 70, respectively. Inner dome 70 includes an inner end 72 attached to middle dome inner end 68 and an outer end 74 fixedly attached to combustor inner liner 42.

Each dome 56 includes a plurality of premixer cups (interchangeably referred to herein as "premixers") 80 to permit uniform mixing of fuel and air therein and to channel the fuel/air mixture into combustion chamber 46. Each premixer cup 80 includes a centerbody 82, an inner swirler 84, an outer swirler 86, and an axis of symmetry 88 extending from an upstream side 90 of dome 56 to a downstream side 92 of dome 56. In one embodiment, inner swirler 84 and outer swirler 86 are counter-rotating. Each centerbody 82 is disposed co-axially with dome axis of symmetry 88 and includes a leading edge 100 and a trailing edge 102. In one embodiment, centerbody 82 is cast within premixer cup 80.

Each inner swirler 84 is secured to a centerbody 82 radially outward from centerbody 82 and includes a leading edge 104 and a trailing edge 106. Each outer swirler 86 is secured to an inner swirler 84 radially outward from inner swirler 84.

A hub 112 separates each inner swirler 84 from each outer swirler 86 and an annular mixing duct 120 is downstream from inner and outer swirlers 84 and 86, respectively. Mixing duct 120 is annular and is defined by an annular wall 122. Annular mixing duct 120 tapers uniformly from dome upstream side 90 to dome downstream side 92 to increase flow velocities within mixing duct 120.

Centerbody 82 also includes a cylindrically-shaped first body portion 130 and a conical second body portion 132. Second body portion 132 extends downstream from first body portion 130.

Centerbody 82 is hollow and includes a first orifice 140 extending from an outer surface 142 of centerbody 82 to an inner passageway 144. First orifice 140 is disposed at a junction between centerbody first body portion 130 and centerbody second body portion 132. First orifice 140 is a fuel port used to supply fuel to premixer cup 80 and inner passageway 144. Orifice 140 is in flow communication with a fuel nozzle 146 positioned at centerbody leading edge 100.

A plurality of second passageways 150 extend through centerbody 82 and are in flow communication with an air source (not shown). Passageways 150 permit small amounts of air to be supplied to combustor 16 to prevent wake separation adjacent centerbody 82.

Combustor domed end 44 also includes an outer dome heat shield 160, a middle dome heat shield 162, and an inner dome heat shield 164 to insulate each respective dome 58, 64, and 70 from flames burning in combustion chamber 46. Outer dome heat shield 160 includes an annular endbody 166 to insulate combustor outer liner 40 from flames burning in an outer primary combustion zone 168. Middle dome heat shield 162 includes annular heat shield centerbodies 170 and 172 to segregate middle dome 64 from outer and inner domes 58 and 70, respectively. Middle dome heat shield centerbodies 170 and 172 are disposed radially outward from a middle primary combustion zone 174.

Inner dome heat shield 164 includes an annular endbody 180 to insulate combustor inner liner 42 from flames burning in an inner primary combustion zone 182. An igniter 184 extends through combustor casing 45 and is disposed downstream from outer dome heat shield endbody 166.

Domes 58, 64, and 70 are supplied fuel and air via a premixer and assembly manifold system (not shown). A plurality of fuel tubes 200 extend between a fuel source (not shown) and domes 56. Specifically, an outer dome fuel tube 202 supplies fuel to premixer cup 80 disposed within outer dome 58, a middle dome fuel tube 204 supplies fuel to premixer cup 80 disposed within middle dome 64, and an inner dome fuel tube (not shown) supplies fuel to premixer cup 80 disposed within inner dome 70.

During operation of gas turbine engine 10, air and fuel are mixed in premixer cups 80 prior to the fuel/air mixture exiting dome 56 and entering combustion chamber 46. As described in the background section above, premixers of this type may be subject to fuel drop-out and coking.

Figure 4:
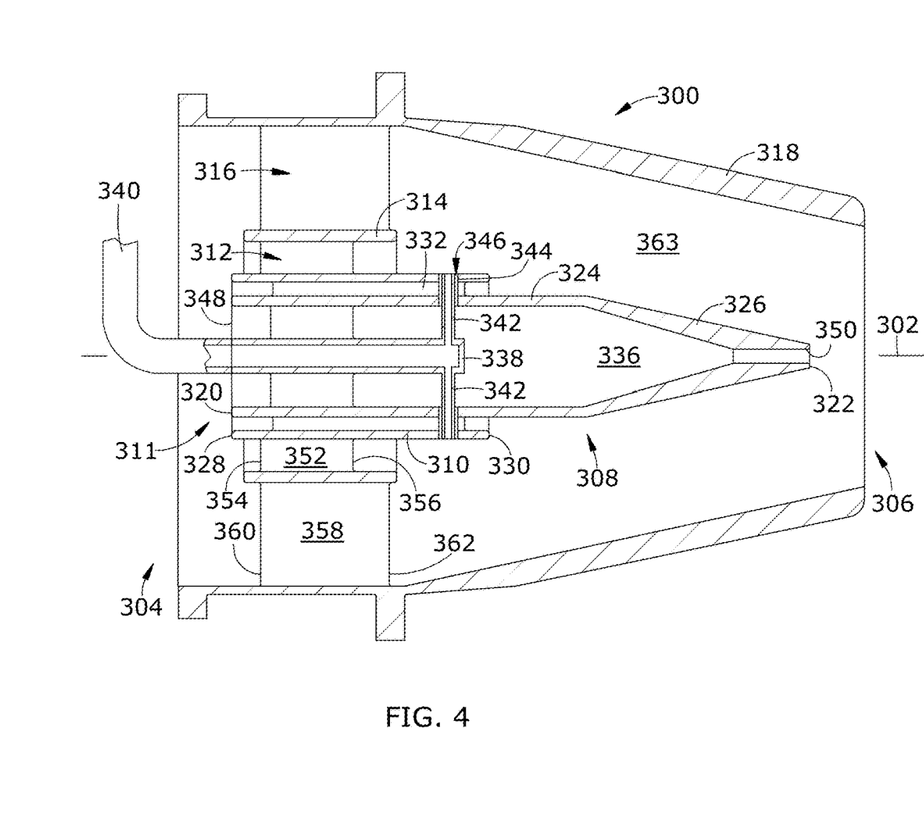
FIG. 4 is a side cross-sectional view of a premixer for use with the combustor shown in FIG. 1.
Figure 5:
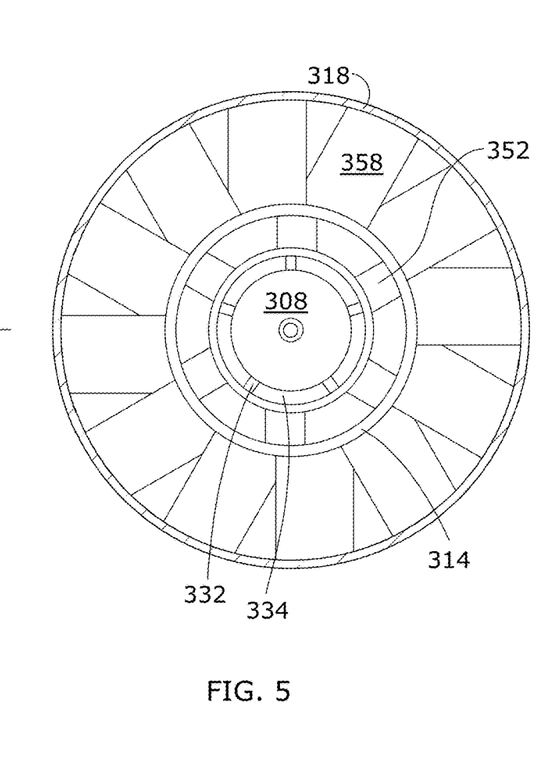
FIG. 5 is an aft looking forward, partially cut away view of the premixer of FIG. 4.

FIGS. 4 and 5 illustrate an embodiment of a premixer 300 suitable for inclusion in a combustor such as the combustor 16 described above. More specifically, premixer 300 may be substituted for the premixers 80.

The premixer 300 has an axis of symmetry 302 extending from an upstream side 304 to a downstream side 306 of the premixer 300. The premixer 300 includes, from radially inboard to radially outboard locations, a centerbody 308, a splitter 310, a swirler assembly 311, and a peripheral wall 318.

The centerbody 308 is disposed co-axially with the axis of symmetry 302 and includes an upstream end 320 and a downstream end 322. The centerbody 308 includes a cylindrically-shaped first body portion 324 and a conical second body portion 326 downstream of the first body portion 324.

The annular splitter 310 surrounds the centerbody 308. It has a leading edge 328 coextensive with the upstream end 320 of the centerbody 308 and trailing edge 330 which is positioned aft of the swirler assembly 311.

A radial gap is defined between the splitter 310 and the outer surface of the centerbody 308. A plurality of struts 332 span the gap, providing a structural interconnection between the splitter 310 and the centerbody 308, and dividing the gap into a plurality of slots 334.

In one embodiment, the struts 332 may be configured so they do not impart a tangential velocity component to air passing through the slots 334. Stated another way, they would not impart "swirl". In another embodiment, the struts 332 may be configured so they do impart a tangential velocity component to air passing through the slots 334. In such an embodiment, one possibility is to configure the struts 332 such that the tangential velocity imparted is less than a tangential velocity imparted by the swirler assembly 311 to air passing therethrough.

The centerbody 308 includes a hollow interior cavity 336. A fuel gallery 338 is disposed inside the interior cavity 336. The fuel gallery 338 is in flow communication with a fuel conduit 340.

A plurality of tubular fuel injectors 342 extend radially outward from the fuel gallery 338 spanning the interior cavity 336, and passing through injector ports 344 in the splitter 310. The injector ports 334 are positioned downstream of the swirler assembly 311.

An annular gap 346 is present between the distal end of each fuel injector 342 and the surrounding injector port 344.

The interior cavity 336 communicates with an inlet 348 at the upstream end 320 of the centerbody 308, the injector ports 344, and an exit 350 at the downstream end of the centerbody 308.

The swirler assembly 311 includes at least one swirler configured to impart a tangential velocity component to air passing therethrough, relative to the axis of symmetry 302. Stated another way, it imparts swirl to the flow. In the illustrated example the swirler assembly 311 includes, from radially inboard to radially outboard locations, an inner swirler 312, a hub 314, and an outer swirler 316.

The inner swirler 312 includes a plurality of inner swirl vanes 352 extending in span from the splitter 310 to the hub 314 and in chord from a leading edge 354 to a trailing edge 356. The inner swirl vanes 352 are configured in terms of size, shape, and angular orientation such that they will impart swirl to the flow.

The outer swirler 316 includes a plurality of outer swirl vanes 358 extending in span from the hub 314 to the peripheral wall 318 and in chord from a leading edge 360 to a trailing edge 362. The outer swirl vanes 358 are configured in terms of size, shape, and angular orientation such that they will impart swirl to the flow. In one embodiment, the inner and outer swirlers 312, 316 impart swirl of opposite directions (also referred to as being "counter-rotating").

An annular mixing duct 363 is defined between the peripheral wall 318 and the centerbody 308 downstream from the swirler assembly 311. The mixing duct 363 tapers in the direction from premixer upstream side 304 to premixer downstream side 306 to increase flow velocities within mixing duct 363.

While the centerbody 308 as shown is configured to inject liquid fuel, the concepts described herein are also applicable to gas fuel or dual-fuel (i.e. liquid/gas) premixers. The centerbody 308 would be modified in accordance with known principles in order to inject gas fuels and/or dual fuels.

In operation, air passes through the inner and outer swirlers 312, 316, producing a swirled flow region of high total kinetic energy. Fuel is injected into this swirling flow from the fuel injectors 342, causing it to break up and atomize.

Simultaneously, air passes through the slots 334 and exits as a non-swirled flow along the exterior surface of the centerbody 308. This flow flushes out any negative velocity region (e.g. recirculation bubble) on the centerbody 308. It functions to keep fuel away from the centerbody 308 and in the area of high total kinetic energy.

Figure 6:
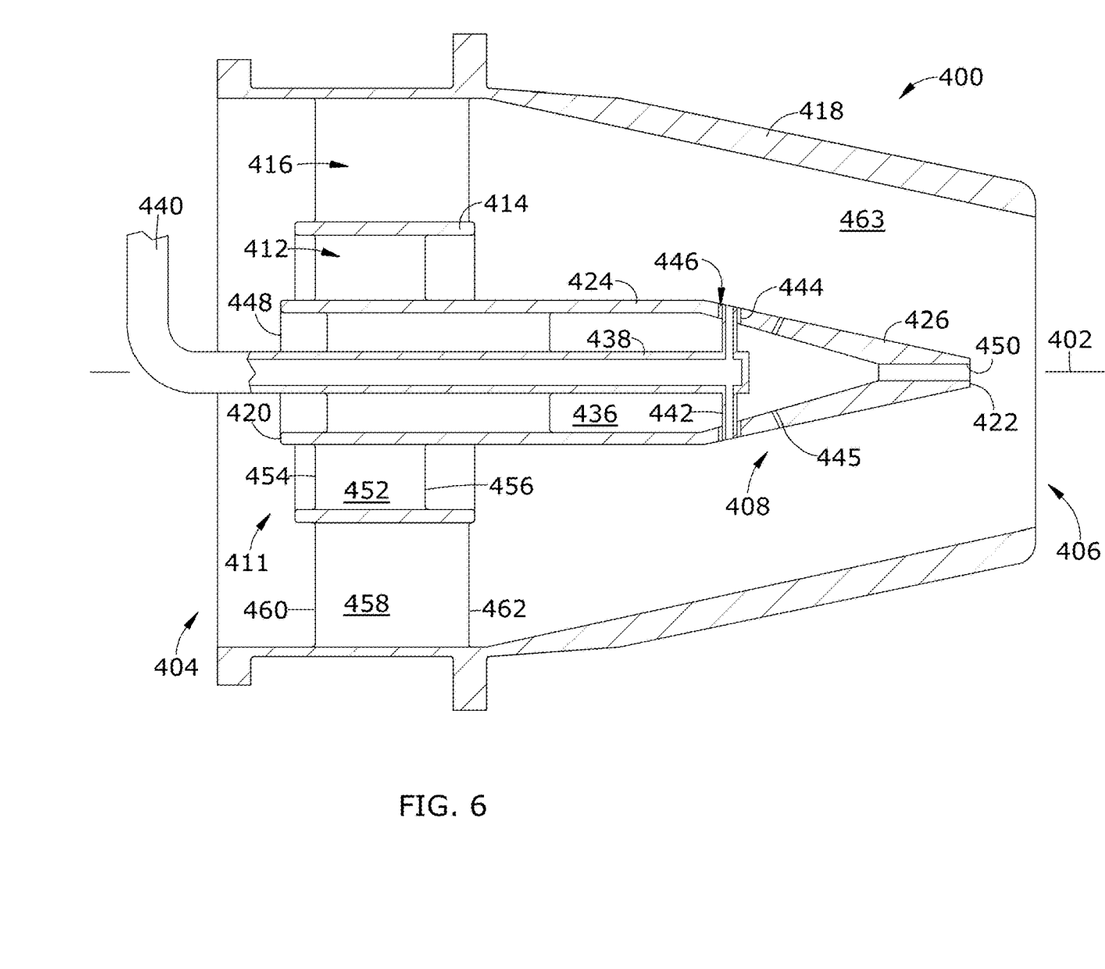
FIG. 6 is a side cross-sectional view of an alternative premixer for use with the combustor shown in FIG. 1.
Figure 7:
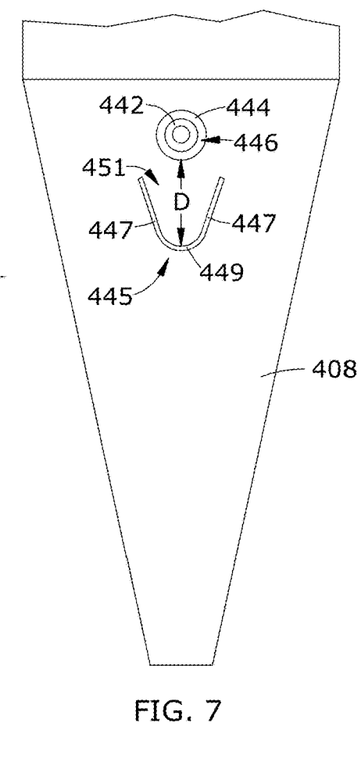
FIG. 7 is a top plan view of a portion of a centerbody of the premixer of FIG. 6.

FIGS. 6 and 7 illustrate an alternative embodiment of a premixer assembly 400 suitable for inclusion in a combustor such as the combustor 16 described above.

The premixer 400 is similar in overall construction to the premixer 300 described above. Elements not explicitly described may be considered to be identical to the corresponding elements of premixer 300.

The premixer 400 has an axis of symmetry 402 extending from an upstream side 404 to a downstream side 406 of the premixer 400. The premixer 400 includes, from radially inboard to radially outboard locations, a centerbody 408, a swirler assembly 411, and a peripheral wall 418.

The centerbody 408 is disposed co-axially with the axis of symmetry 402 and includes an upstream end 420 and a downstream end 422. Centerbody 408 includes a cylindrically-shaped first body portion 424 and a conical second body portion 426 downstream of the first body portion 424.

Centerbody 408 includes a hollow interior cavity 436. A fuel gallery 438 is disposed inside the interior cavity 436. The fuel gallery 438 is in flow communication with a fuel conduit 440.

A plurality of tubular fuel injectors 442 extend outward from the fuel gallery 438 spanning the interior cavity 436, and passing through injector ports 444 in the centerbody 408. In the illustrated example, the injector ports 444 and the fuel injectors 442 are located in a forward half of the second body portion 426, just downstream of the intersection of the first and second body portions 424, 426.

An annular gap 446 is present between the distal end of each fuel injector 442 and the surrounding injector port 444.

The interior cavity 436 communicates with an inlet 448 at the upstream end 420 of the centerbody 408, the injector ports 444, and an exit 450 at the downstream end of the centerbody 408.

The centerbody 408 includes one or more discharge slots 445. One discharge slot 445 is positioned downstream or axially aft of each of the fuel injectors 442. Each discharge slot 445 is a shape which is generally concave in the upstream or axially forward direction. Numerous shapes are possible including "U", "V", partial elliptical shapes, or corrugated shapes. In the illustrated example, the discharge slot 445 is roughly V-shaped, with a pair of divergent legs 447 interconnected by a curved end portion 449.

The discharge slot 445 is located an axial distance "D" downstream of the respective fuel injector port 444 (measured, for reference purposes, from the aftmost end of the discharge slot 445 to the center of the fuel injector 442). This spacing leaves a portion of solid material, labeled 451, between the discharge slot 445 and the respective fuel injector port 444.

The discharge slots 445 pass through the wall thickness of the centerbody 408. and communicate with the interior cavity 436.

The swirler assembly 411 includes at least one swirler configured to impart a tangential velocity component to air passing therethrough, relative to the axis of symmetry 402. Stated another way, it imparts swirl to the flow. In the illustrated example the swirler assembly 411 includes, from radially inboard to radially outboard locations, an inner swirler 412, a hub 414, and an outer swirler 416.

The inner swirler 412 includes a plurality of inner swirl vanes 452 extending in span from the centerbody 408 to the hub 414 and in chord from a leading edge 454 to a trailing edge 456. The inner swirl vanes 452 are configured in terms of size, shape, and angular orientation such that they will impart swirl to the flow.

The outer swirler 416 includes a plurality of outer swirl vanes 458 extending in span from the hub 414 to the peripheral wall 418 and in chord from a leading edge 460 to a trailing edge 462. The outer swirl vanes 458 are configured in terms of size, shape, and angular orientation such that they will impart swirl to the flow. In one embodiment, the inner and outer swirlers 412, 416 impart swirl of opposite directions or are counter-rotating.

An annular mixing duct 463 is defined between the peripheral wall 418 and the centerbody 408 downstream from the swirler assembly 411. The mixing duct 463 tapers in the direction from premixer upstream side 404 to premixer downstream side 406 to increase flow velocities within mixing duct 463.

While the centerbody 408 as shown is configured to inject liquid fuel, the concepts described herein are also applicable to gas fuel or dual-fuel (i.e. liquid/gas) premixers. The centerbody 408 would be modified in accordance with known principles in order to inject gas fuels and/or dual fuels.

In operation, air passes through the inner and outer swirlers 412, 416, producing a swirled flow region of high total kinetic energy. Fuel is injected into this swirling flow from the fuel injectors 442, causing it to break up and atomize.

Simultaneously, air enters the interior cavity 436 of the centerbody 408 through the inlet 448. This flow exits the discharge slots 445. This flow functions to keep fuel away from the centerbody 408 and improve jet penetration. Analysis has shown that this function is achieved with less total airflow than would be required for an equivalent open area encompassing the space between the fuel injector port 444 and the aft end of the discharge slot 445, as has been used in the prior art.

Figure 8:
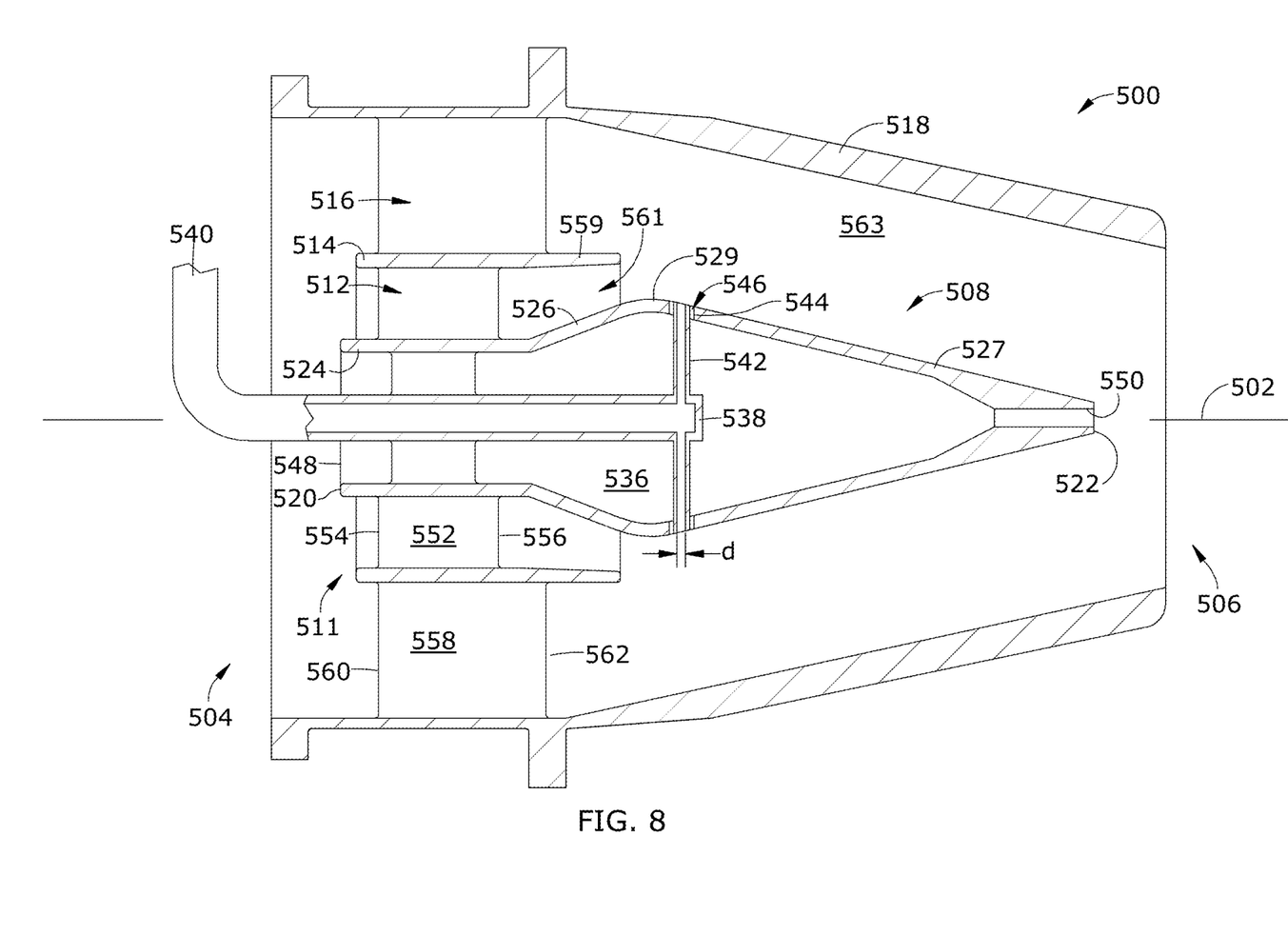
FIG. 8 is a side cross-sectional view of another alternative premixer for use with the combustor shown in FIG. 1.

FIG. 8 illustrates an alternative embodiment of a premixer assembly 500 suitable for inclusion in a combustor such as the combustor 16 described above.

The premixer 500 is similar in overall construction to the premixer 300 described above. Elements not explicitly described may be considered to be identical to the corresponding elements of premixer 300.

The premixer 500 has an axis of symmetry 502 extending from an upstream side 504 to a downstream side 506 of the premixer 500. The premixer 500 includes, from radially inboard to radially outboard locations, a centerbody 508, a swirler assembly 511, and a peripheral wall 518.

The centerbody 508 is disposed co-axially with dome axis of symmetry 502 and includes an upstream end 520 and a downstream end 522. Centerbody 508 comprises includes a cylindrically-shaped first body portion 524, a diverging second body portion 526 downstream of the first body portion 524, and a conical tapering third body portion 527 downstream of the second body portion 526. The intersection of the second and third body portions 526, 527 defines a peak 529 of the centerbody. The maximum diameter of the centerbody 508 is at the peak 529.

The centerbody 508 includes a hollow interior cavity 536. A fuel gallery 538 is disposed inside the interior cavity 536. The fuel gallery 538 is in flow communication with a fuel conduit 540.

A plurality of tubular fuel injectors 542 extend radially outward from the fuel gallery 538 spanning the interior cavity 536, and passing through injector ports 544 in the centerbody 508. In the illustrated example, the injector ports 544 and the fuel injectors 542 are located in a forward half of the third body portion 527, just downstream of the intersection of the second and third body portions 526, 527.

An annular gap 546 is present between the distal end of each fuel injector 542 and the surrounding injector ports 544.

The interior cavity 536 communicates with an inlet 548 at the upstream end 520 of the centerbody 508, the injector ports 544, and an exit 550 at the downstream end of the centerbody 508.

The swirler assembly 511 includes at least one swirler configured to impart a tangential velocity component to air passing therethrough, relative to the axis of symmetry 502. Stated another way, it imparts swirl to the flow. In the illustrated example the swirler assembly 511 includes, from radially inboard to radially outboard locations, an inner swirler 512, a hub 514, and an outer swirler 316.

The inner swirler 512 includes a plurality of inner swirl vanes 552 extending in span from the centerbody 508 to the hub 514 and in chord from a leading edge 554 to a trailing edge 556. The inner swirl vanes 552 are configured in terms of size, shape, and angular orientation such that they will impart swirl to the flow.

The outer swirler 516 includes a plurality of outer swirl vanes 558 extending in span from the hub 514 to the peripheral wall 518 and in chord from a leading edge 560 to a trailing edge 562. The outer swirl vanes 558 are configured in terms of size, shape, and angular orientation such that they will impart swirl to the flow. In one embodiment, the inner and outer swirlers 512, 516 impart swirl of opposite directions or are counter-rotating.

The hub 514 includes an aft portion defining a splitter lip 559. The splitter lip 559 extends aft beyond the trailing edges 556 and 562 of both the inner swirl vanes 552 and the outer swirl vanes 558. In the illustrated example, the splitter lip 559 terminates at an axial location slightly upstream of the peak 529 of the centerbody 508. In some embodiments the splitter lip 559 may terminate at an axial location which is about 5 to 10 fuel injector diameters "d" upstream of the fuel injectors 542. The splitter lip 559 and the second portion 526 of the centerbody 508 define a converging channel 561 therebetween. The splitter lip 559 may be tapered in thickness from front to rear.

An annular mixing duct 563 is defined between the peripheral wall 518 and the centerbody 508 downstream from inner and outer swirlers 512 and 516. The mixing duct 563 tapers in the direction from premixer upstream side 504 to premixer downstream side 506 to increase flow velocities within mixing duct 563.

While the centerbody 514 as shown is configured to inject liquid fuel, the concepts described herein are also applicable to gas fuel or dual-fuel (i.e. liquid/gas) premixers. The centerbody 514 would be modified in accordance with known principles in order to inject gas fuels and/or dual fuels.

In operation, air passes through the inner and outer swirlers 512, 516, producing a swirled flow region of high total kinetic energy. Fuel is injected into this swirling flow from the fuel injectors 542, causing it to break up and atomize.

The splitter lip 559 creates high turbulence closer to the fuel injectors 542, control penetration of fuel jet and prevents wetting of the shroud wall.

Figure 9:
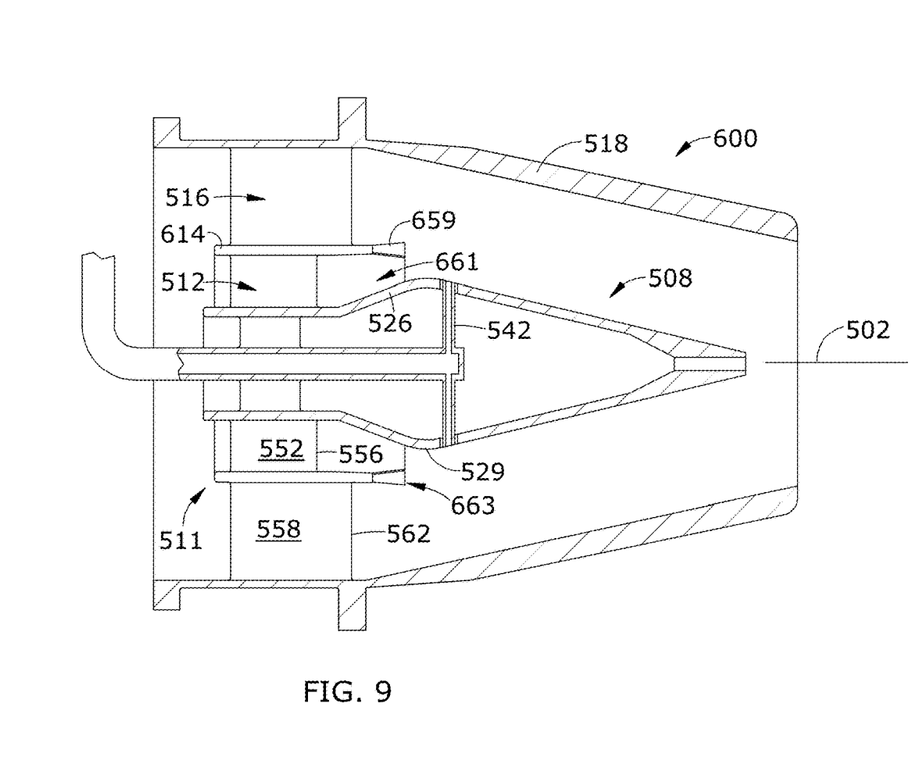
FIG. 9 is a side cross-sectional view of an optional variation of the premixer shown in FIG. 8.
Figure 10:
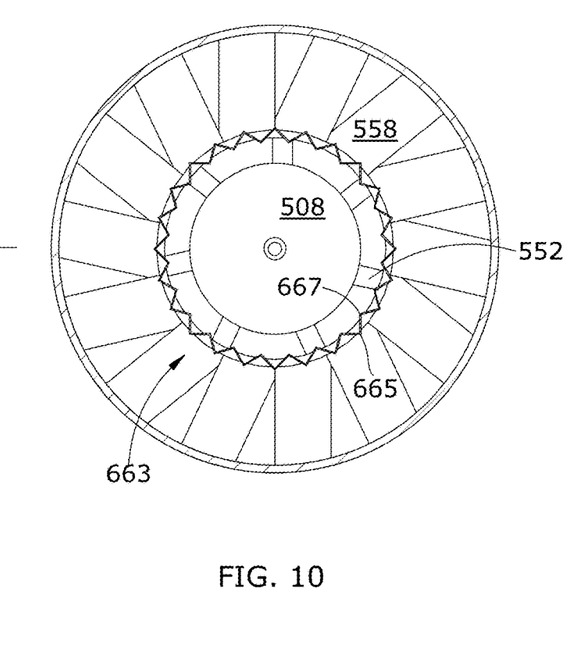
FIG. 10 is an aft looking forward, partially cut away view of the premixer of FIG. 9.

FIGS. 9 and 10 illustrate a premixer 600 which is a modification of the premixer 500. Its overall construction may be identical to that of the premixer 500 except for the hub. The premixer 600 has an axis of symmetry 502 and includes, from radially inboard to radially outboard locations, a centerbody 508, a swirler assembly 511 including inner and outer swirlers 512, 516 and a hub 614, and a peripheral wall 518.

The hub 614 includes an aft portion defining a splitter lip 659. The splitter lip 659 extends aft beyond the trailing edges 556 and 562 of both the inner swirl vanes 552 and the outer swirl vanes 558. In the illustrated example, the splitter lip 659 terminates at an axial location slightly upstream of the peak 529 of the centerbody 508, i.e. in an aft half of the second body portion 526. In some embodiments the splitter lip 659 may terminate at an axial location which is about 5 to 10 fuel injector diameters "d" upstream of the fuel injectors 542. The splitter lip 659 and the second portion 526 of the centerbody 508 define a converging channel 661 therebetween.

In this variation, an aft portion of the splitter lip 659 is formed into a mixer 663 including an annular array of "teeth" which define alternating ridges 665 and troughs 667 around the circumference of the splitter lip 659. The pitch or spacing of the teeth may be uniform or variable. The mixer 663 is effective to improve total kinetic energy close to the location of liquid fuel injection.

The premixer configurations described herein have advantages over the prior art. They will improve fuel-air mixing and also prevent wetting of premixer walls, thus reducing the risk of fuel coking.

The foregoing has described a premixer for a combustor. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

A premixer for a combustor, comprising: a centerbody disposed along an axis of symmetry, the centerbody including a hollow interior cavity; a swirler assembly disposed radially outward of the centerbody, the swirler assembly including at least one swirler configured to impart a tangential velocity component to an air flow passing therethrough; an annular peripheral wall disposed radially outward of the centerbody and the swirler assembly such that a mixing duct is defined between the peripheral wall and the centerbody, downstream from the swirler assembly; an annular splitter positioned radially inward of the swirler assembly and radially outward of the centerbody such that a radial gap is defined between the splitter and an outer surface of the centerbody, wherein the splitter includes a trailing edge which extends axially aft of the swirler assembly; a fuel gallery disposed inside the interior cavity of the centerbody; and at least one fuel injector extending outward from the fuel gallery and passing through an injector port communicating with the outer surface of the splitter.

The premixer of any preceding clause wherein a plurality of struts span the gap between the splitter and the outer surface of the centerbody, so as to divide the gap into a plurality of slots.

The premixer of any preceding clause wherein the struts are be configured so they do not impart a tangential velocity component to air passing through the slots.

The premixer of any preceding clause wherein the struts are configured so they impart a tangential velocity component to air passing through the slots.

The premixer of any preceding clause wherein the struts are configured so they impart a tangential velocity component to air passing through the slots which is less than a tangential velocity component imparted by the swirler assembly to air passing therethrough.

The premixer of any preceding clause wherein the swirler assembly includes: an inner swirler and an outer swirler separated from each other by an annular hub.

The premixer of any preceding clause wherein the inner and outer swirlers are counter-rotating.

A combustor for a gas turbine engine, comprising: an annular inner liner; an annular outer liner spaced apart from the inner liner; a domed end disposed at an upstream end of the inner and outer liners, the domed end including at least one annular dome, wherein each annular dome includes an annular array of premixers according to any preceding clause.

A premixer for a combustor, comprising: a centerbody disposed along an axis of symmetry, the centerbody including a hollow interior cavity; a swirler assembly disposed radially outward of the centerbody, the swirler assembly including at least one swirler configured to impart a tangential velocity component to an air flow passing therethrough; an annular peripheral wall disposed radially outward of the centerbody and the swirler assembly such that a mixing duct is defined between the peripheral wall and the centerbody, downstream from the swirler assembly; a fuel gallery disposed inside the interior cavity of the centerbody; at least one fuel injector extending outward from the fuel gallery and passing through an injector port in the centerbody; and a discharge slot having a convex-forward shape passing through the centerbody downstream of the injector port and communicating with the interior cavity.

The premixer of any preceding clause wherein the discharge slot has a V-shape, with a pair of divergent legs interconnected by a curved end portion.

The premixer of any preceding clause wherein the discharge slot is located an axial distance downstream of the respective fuel injector port so as to leave a portion of solid material of the centerbody between the discharge slot and the respective fuel injector port.

The premixer of any preceding clause wherein the centerbody includes a cylindrically-shaped first body portion and a conical second body portion downstream of the first body portion; and the injector ports and the fuel injectors are located in a forward half of the second body portion.

A combustor for a gas turbine engine, comprising: an annular inner liner; an annular outer liner spaced apart from the inner liner; a domed end disposed at an upstream end of the inner and outer liners, the domed and including at least one annular dome, wherein each annular dome includes an annular array of premixers according to any preceding clause.

A premixer for a combustor, comprising: a centerbody disposed along an axis of symmetry, the centerbody including a hollow interior cavity; a swirler assembly disposed radially outward of the centerbody, the swirler assembly including inner and outer swirlers configured to impart a tangential velocity component to an air flow passing therethrough, separated by an annular hub; an annular peripheral wall disposed radially outward of the centerbody and the swirler assembly such that a mixing duct is defined between the peripheral wall and the centerbody, downstream from the swirler assembly; a fuel gallery disposed inside the interior cavity of the centerbody; at least one fuel injector extending outward from the fuel gallery and passing through an injector port in the centerbody; and wherein the hub includes an aft portion defining a splitter lip which extends aft beyond both the inner and outer swirlers.

The premixer of any preceding clause wherein the centerbody includes a cylindrically-shaped first body portion, a diverging second body portion downstream of the first body portion, and a conical tapering third body portion downstream of the second body portion; and the intersection of the second and third body portions defines a peak of maximum diameter.

The premixer of any preceding clause wherein the injector ports and the fuel injectors are located in a forward half of the third body portion.

The premixer of any preceding clause wherein the splitter lip terminates at an axial location in an aft half of the second body portion, upstream of the peak of the centerbody.

The premixer of any preceding clause wherein the splitter lip terminates at an axial location which is 5 to 10 fuel injector diameters upstream of the fuel injectors.

The premixer of any preceding clause wherein the splitter lip and the second portion of the centerbody define a converging channel therebetween.

The premixer of any preceding clause wherein the splitter lip tapers in thickness from front to rear.

The premixer of any preceding clause wherein an aft portion of the splitter lip is formed into a mixer including an annular array of alternating ridges and troughs around the circumference of the splitter lip.

A combustor for a gas turbine engine, comprising: an annular inner liner; an annular outer liner spaced apart from the inner liner; a domed end disposed at an upstream end of the inner and outer liners, the domed and including at least one annular dome, wherein each annular dome includes an annular array of premixers according to any preceding clause.

What is claimed is:

1. A premixer for a combustor, comprising:
   a centerbody disposed along an axis of symmetry, the centerbody including a hollow interior cavity;
   a swirler assembly disposed radially outward of the centerbody, the swirler assembly including at least one swirler configured to impart a tangential velocity component to an air flow passing therethrough;
   an annular peripheral wall disposed radially outward of the centerbody and the swirler assembly such that a mixing duct is defined between the annular peripheral wall and the centerbody, downstream from the swirler assembly;
   a fuel gallery disposed inside the hollow interior cavity of the centerbody;
   a fuel injector extending outward from the fuel gallery and passing through an injector port in the centerbody; and
   a discharge slot having a concave-forward shape passing through the centerbody downstream of the injector port and communicating with the hollow interior cavity,
   wherein the discharge slot is located an axial distance downstream of the injector port so as to leave a portion of solid material of the centerbody between the discharge slot and the injector port.

2. The premixer of claim 1, wherein the discharge slot has a curved shape, with a pair of divergent legs interconnected by a curved end portion.

3. The premixer of claim 2, wherein the curved shape is a V-shape, a U-shape, a partial elliptical shape, or a corrugated shape.

4. The premixer of claim 1, wherein the discharge slot is configured to keep a fuel jet exiting through the injector port away from the centerbody and to improve penetration of the fuel jet.

5. The premixer of claim 1, wherein the discharge slot has a curved shape having a convex portion directed towards a downstream end of the centerbody.

6. The premixer of claim 1, wherein the discharge slot is spaced apart from the injector port by the axial distance downstream of the injector port, the axial distance measured from an aftmost end of the discharge slot to a center of the injector port.

7. The premixer of claim 1,
   wherein the centerbody includes a cylindrically-shaped first body portion and a conical second body portion downstream of the cylindrically-shaped first body portion; and
   wherein the injector port and the discharge slot are located in a forward half of the conical second body portion.

8. The premixer of claim 1, wherein the centerbody comprises an upstream end and a downstream end, and a first body portion having a cylindrical shape and a second body portion, downstream of the first body portion, having a conical tapering shape.

9. The premixer of claim 8, wherein the discharge slot is located in the second body portion.

10. The premixer of claim 8, wherein the second body portion of the centerbody has an exit centered around the axis of symmetry.

11. The premixer of claim 1, wherein the fuel gallery is disposed inside the hollow interior cavity, and the fuel gallery being in communication with a fuel conduit.

12. The premixer of claim 1, wherein a distal end of the fuel injector extending outward from the fuel gallery and the injector port are spaced apart by a gap.

13. The premixer of claim 1, wherein the at least one swirler comprises a plurality of swirlers separated by an annular hub.

14. The premixer of claim 13, wherein the at least one swirler includes an inner swirler and an outer swirler, the inner swirler including a plurality of inner swirler vanes and the outer swirler including a plurality of outer swirler vanes.

15. The premixer of claim 14, wherein the inner swirler vanes extend in a span from the centerbody to the annular hub, and the outer swirler vanes extend in a span from the annular hub to the annular peripheral wall.

16. The premixer of claim 1, wherein an annular gap is provided between a distal end of the fuel injector and the injector port.

17. The premixer of claim 1, wherein the hollow interior cavity communicates with an inlet at an upstream end of the centerbody and an exit at a downstream end of the centerbody.

18. The premixer of claim 1, wherein the annular peripheral wall and the centerbody define an annular mixing duct downstream from the swirler assembly, the mixing duct tapering in a direction from a premixer upstream side to a premixer downstream side to increase flow velocities within the mixing duct.

19. A combustor for a gas turbine engine, comprising:
an annular inner liner;
an annular outer liner spaced apart from the annular inner liner; and
a domed end disposed at an upstream end of the annular inner liner and the annular outer liner, the domed end including at least one annular dome, wherein each annular dome includes an annular array of premixers according to claim 1.

* * * * *